United States Patent [19]

Lundberg et al.

[11] 4,181,815
[45] Jan. 1, 1980

[54] SELF-FLOATING CABLE FOR MARINE OPERATIONS

[75] Inventors: Bo E. O. Lundberg, Sundbyberg; Viktor Scuka, Upplands-Väsby, both of Sweden

[73] Assignee: Telefonaktiebolaget L M Ericsson, Stockholm, Sweden

[21] Appl. No.: 923,680

[22] Filed: Jul. 12, 1978

[30] Foreign Application Priority Data

Jul. 26, 1977 [SE] Sweden ............................ 7708593

[51] Int. Cl.² .......................... H01B 7/12; H01B 7/18
[52] U.S. Cl. ............................ 174/101.5; 174/70 A; 174/70 R; 174/115
[58] Field of Search ................. 174/101.5, 12 R, 13, 174/70 A, 70 R, 115

[56] References Cited

U.S. PATENT DOCUMENTS

| | | | |
|---|---|---|---|
| 1,008,370 | 11/1911 | Robillot | 174/115 |
| 2,015,063 | 9/1935 | Bennett | 174/12 R |
| 3,259,687 | 7/1966 | Oatess | 174/13 X |
| 3,483,313 | 12/1969 | Schaffhauser | 174/101.5 |
| 3,571,486 | 3/1971 | Kennedy | 174/70 R |

FOREIGN PATENT DOCUMENTS

| | | | |
|---|---|---|---|
| 358373 | 10/1931 | United Kingdom | 174/13 |
| 605141 | 9/1960 | United Kingdom | 174/10.1 |

*Primary Examiner*—Richard R. Kucia
*Attorney, Agent, or Firm*—Hane, Roberts, Spiecens & Cohen

[57] ABSTRACT

An electrical cable of the self-floating type for use in marine environments is provided with elements for taking up mechanical tractive forces. The electrical conductors of the cable are surrounded by an inner friction layer with a low friction coefficient. Around this layer a force equalizing layer of metallic material is provided and this layer is surrounded by a tube of plastic material showing a number of circumferentially situated grooves. An outer friction layer of the same material as the inner friction layer surrounds the hollow strands and the whole system together with the elements for taking up the tractive forces is embedded by a cable mantle of rubber-like plastic material.

3 Claims, 2 Drawing Figures

SELF-FLOATING CABLE FOR MARINE OPERATIONS

BACKGROUND OF THE INVENTION

The present invention relates to a self-floating cable for marine operations of the type which is described in our U.S. application Ser. No. 823,288 and which shows a different design of the force absorbing layer included in the system of the cable which transfers the electric energy.

In the cable according to the above-mentioned patent, the force absorbing layer consists of a number of hollow chords which are applied so as to surround the force equalizing layer with a certain pitch relative to the longitudinal direction of the cable.

A further development of this cable construction includes according to the present invention, in that the force absorbing layer, when manufacturing the cable, is provided by extruding a layer which has one or more casings or tubes of soft plastic material along the force equalizing layer and which shows longitudinal grooves of certain cross-section profile. The advantage with this type of the force absorbing layer compared to the previously known layer in the form of hollow chords is that the manufacturing procedure of the cable due to the extrusion procedure can be considerably simpler.

SUMMARY OF THE INVENTION

An object of the present invention is thus to provide a new design of the force absorbing layer in a cable of the type shown in the above-mentioned U.S. patent application in order to attain a simpler and cheaper manufacture of the cable.

Another object of the present invention is to provide a force absorbing layer in a cable of the self-floating type which in combination with an outer and an inner friction layer will highly reduce the influence of radially directed forces on the electrical conductors in the cable center due to external forces.

BRIEF DESCRIPTION OF THE DRAWING

The invention, the characteristics of which appear from the appended claims, will be described in greater detail with reference to the accompanying drawing where:

Figure 1:
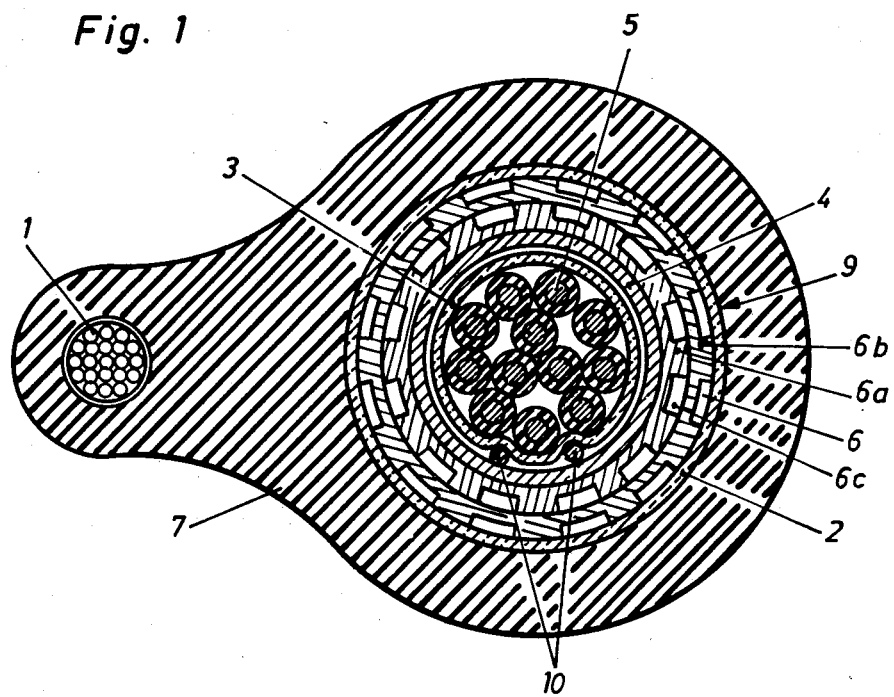
FIG. 1 shows a cross-section of a cable with a force absorbing layer according to the invention in a first embodiment.

In the following, only the force absorbing layer 6 is described according to FIG. 1, since the other parts of the cable shown therein are of the same construction as earlier described in the above-described U.S. patent application.

Outside the force equalizing layer 4 (metal tape or the like) a tube 6a of soft plastic material, for example, polyethylene foam is applied. The tube 6a shows a number of grooves 6c situated around its periphery which run in the longitudinal direction of the cable. The raised portions thus formed contact with their upper limitation surfaces against an additional tube 6b of the same design as the tube 6a. In FIG. 1, two such tubes are shown but it is understood that more than two or that only one such tube can be applied on the metallic layer 4. Outside the utmost situated tube 6b, the outer friction layer 2 is wound as it appears from the above-mentioned application.

Figure 2:
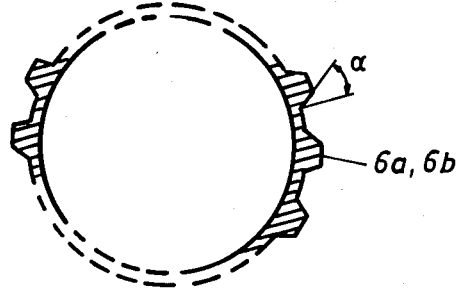
FIG. 2 shows a second embodiment of the layer according to the invention.

The cross-section profile of the grooves 6c can be given different design. For example, its walls may be given a radial direction as shown in FIG. 1, or, alternatively, the walls may incline a certain angle $a$ relative to the radial direction as shown in FIG. 2. This later design of the grooves 6c is especially suitable when great forces are to be absorbed or when the cable is situated at great depths.

At great depths it is, furthermore, suitable to choose harder plastic material of the layer 6, for example, a thermoplastic elastomer.

We claim:

1. In a self-floating cable with high flexibility, preferably for marine operations, comprising two separate conductor systems of which one transfers energy and the second is load-absorbing, the two conductor systems being surrounded by a common cable mantel and one of the systems being constituted of a number of inner conductors, an inner overlapping friction layer of plastic material with low friction coefficient when contacting its own surface, a metallic layer lying over said layer, a force absorbing layer lying over said metallic layer and an outer overlapping friction layer of plastic material with low friction coefficient when contacting its own surface lying nearest to the mantel of the cable and over the force absorbing layer, the improvement comprising that the force absorbing layer includes at least one tube of plastic material which in the longitudinal direction of the cable has a number of circumferentially situated grooves separated by spacer portions, the outer limitation surface of said portions of the utmost lying tube contacting the outer overlapping friction layer in a slipping contact relationship when influenced by external forces on the common cable mantel.

2. A cable according to claim 1, wherein the direction of the walls of said grooves mainly coincide with planes extending radially from the axis of one of the conductor systems.

3. A cable according to claim 1, wherein the direction of the walls of said grooves diverges by a given acute angle from the radial planes extending from the axis of one of the conductor systems.

* * * * *